United States Patent [19]

Jenkins, Jr. et al.

[11] 4,430,093

[45] Feb. 7, 1984

[54] DIESEL FUEL ADDITIVE

[75] Inventors: Robert H. Jenkins, Jr., Walden; William M. Sweeney, Wappingers Falls, both of N.Y.

[73] Assignee: Texaco Inc., White Plains, N.Y.

[21] Appl. No.: 423,940

[22] Filed: Sep. 27, 1982

[51] Int. Cl.³ .............................................. C10L 1/18
[52] U.S. Cl. ........................................ 44/70; 44/78; 560/52
[58] Field of Search ...................... 44/70, 78; 560/52

[56] References Cited

U.S. PATENT DOCUMENTS

| | | | |
|---|---|---|---|
| 2,937,933 | 5/1960 | Heisler et al. | 44/70 |
| 2,956,870 | 10/1960 | Heisler et al. | 44/70 |
| 3,429,852 | 2/1969 | Skoultchi | 560/52 |
| 4,079,183 | 3/1978 | Green | 560/52 |
| 4,171,371 | 10/1979 | Diana | 560/52 |

Primary Examiner—Charles F. Warren
Assistant Examiner—Mrs. Y. Harris Smith
Attorney, Agent, or Firm—Robert A. Kulason; Robert Knox, Jr.; Alan M. Kamel

[57] ABSTRACT

The invention relates to a novel compound comprising the reaction product of a benzophenonetetracarboxylic dianhydride or a benzophenonetetracarboxylic acid, in particular, 3,3'4,4'-benzophenonetetracarboxylic dianhydride, and a polyol, and the use of this novel compound as a stabilizer for middle distillate fuels extended with non-petroleum distillates.

8 Claims, No Drawings

DIESEL FUEL ADDITIVE

BACKGROUND OF THE INVENTION

1. Field of the Invention

In these times of uncertainty about the availability of energy supplies, there is substantial interest in discovering ways to increase the usuable amount of liquid hydrocarbon fuels available. One way that this can be accomplished is by adding a non-petroleum derived fuel source to, for example, middle distillate oils.

Various problems have arisen from the extension of middle distillate petroleum fuels with non-petroleum derived fuels, such as those derived from shale oil, tar sands, alcohols, vegetable oils, and other oxygenated materials, or mixtures thereof. It has been found that middle distillate fuels extended with these materials are unable to achieve a sufficiently high rating in the Potential Deposits Test (P.D.), a test method for predicting the storage stability of middle distillates, to allow the fuel mixture to be commercially usable. Fuel mixtures which do not achieve at least a 2 rating in the P.D. test have an unacceptably low stability and are unable to be stored for long periods of time. That is, insoluble material formed during the storage of the fuel material precipitates out from the fuel mixture. If this should occur in an oil storage tank, the precipitated-out material tends to clog the filters which the oil comes in contact with and thus hinders or prevents the oil from being pumped from the facility. Likewise, if this were to occur in the fuel tank of a motor vehicle, the precipitated out material would not only clog the fuel line, but would also cause engine deposits to form, fouling the fuel injectors and interfering with the combustion of the fuel.

2. Description of the Prior Art

Commonly assigned U.S. Pat. No. 2,956,870 discloses a dibenzoate of a polyethylene glycol and a short chain alkoxyalkyl phthalate, having the following general formula:

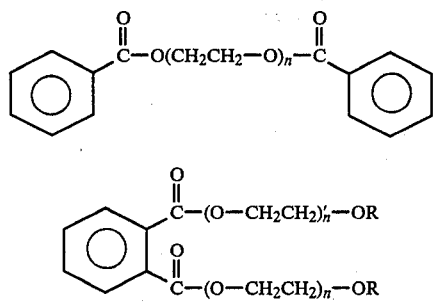

wherein n ranges from 2 to 12, preferably 4 to 8, and n' ranges from 1 to 5, preferably 1 to 2, and R is an alkyl group having from 1 to 6 carbon atoms. This additive when added to an engine lubricating oil composition acts to control deposits in the combustion zone.

SUMMARY OF THE INVENTION

In accordance with this invention, a novel composition is provided comprising the reaction product of a benzophenonetetracarboxylic dianhydride or a benzophenonetetracarboxylic acid, in particular, 3,3',4,4'-benzophenonetetracarboxylic dianhydride, and a polyol, and a stabilized middle distillate fuel composition containing said composition.

DETAILED DESCRIPTION OF THE INVENTION

The novel composition of the invention is the reaction product of a benzophenonetetracarboxylic dianhydride or benzophenoneteracarboxylic acid and a polyol which is a polyoxyalkylene derivative of propylene glycol.

The preferred benzophenone reactant is the dianhydride, specifically 3,3',4,4'-benzophenonetetracarboxylic dianhydride. The corresponding benzophenonetetracarboxylic acid is equivalent to the dianhydride in this reaction and it is understood that they are mutually interchangeable for the manufacture of the prescribed reaction product.

The prescribed type polyol for this reaction is represented by the following structure:

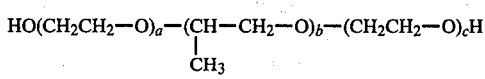

wherein a is equal to 3 to 185, b is equal to 10 to 300 and c is equal to 3 to 185. Preferably, a is from 5 to 150, b is from 10 to 60, and c is from 5 to 150. Some examples of suitable polyols include those that are commercially available and being sold under the Pluronic trademark and have a molecular weight ranging from 2200 to 2800. The preferred polyol employed has a molecular weight of 2650.

The polyols which may be employed are polyoxyalkylene derivatives of propylene glycol. The molecular weight of these nonionic difunctional block-polymers terminating in primary hydroxyl groups ranges from 1,000 to over 15,000. The material may display various hydopobic-hydrophilic properties depending on the structure of the polyol. The percentage of the molecular weight of the polyol that is comprised of the hydrophobic poly(oxypropylene) base and of the hydrophilic poly(oxyethylene) end groups determines the specific properties of the polyol. Normally, the hydrophilic poly(oxyethylene) end groups comprises from 10 to about 80 percent by weight of the structure.

The term "middle distillate" as used herein is meant to include petroleum distillates which boil at a temperature within the range of 660° to 675° F. at the end point. Of particular interest are those liquid hydrocarbon fuel stocks which have the same boiling point range as number 2 diesel fuel, that is, fuels which boil at a temperature within the range of 440° to 475° F. at the 10% distilled point and which boil within the range of 660°-675° F. at the end point. By the term "non-petroleum distillate" is meant materials which are not derived from crude stock and may include shale oil, tar sand distillates, alcohols, vegetable oils or mixtures of the same.

In general, in preparing the prescribed reaction product of the invention, the polyol is added to the benzophenonetetracarboxylic dianhydride or benzophenonetetracarboxylic acid in a molar ratio ranging from 0.75:1 to 1.25:1, respectively. Preferably, the polyol is added in a 1:1 molar ratio. A solvent may be used, so long as it is capable of dissolving the particular polyol employed; the solvent must also be able to dissolve the acid or dianhydride. When both the acid or dianhydride and the particular polyol employed have been dissolved in a solvent (the order of the addition sequence is not important) the mixture is heated to reflux. It has been observed that the temperature at reflux is about 150° C. After refluxing, the reaction product is cooled and filtered. The solvents are then, for example, removed by a rotary evaporator.

The following examples illustrate the preparation of the reaction product of this invention.

EXAMPLE I

200 Grams (0.0755 mole) of a block polyol polymer formed via a propylene glycol initiated reaction of propylene oxide and ethylene oxide having a molecular weight of 2650 (Pluronic polyol L-63) was dissolved in 200 ml of dimethyl formamide and the mixture was placed in a round bottom flask equipped with a thermometer, an addition funnel, and a mechanical stirrer. To this mixture was added 20.7 grams (0.0640 mole) of 3,3′,4,4′-benzophenonetetracarboxylic dianhydride dissolved in 200 ml of dimethyl formamide. The contents in the flask were refluxed for 1 hour and the temperature achieved at reflux was 152° C. After refluxing for about an hour, the reaction mixture was cooled, filtered through paper, and placed on a rotary evaporator where the solvents were removed. The formed product has a molecular weight of 4047, a TAN of 51.8 and displays an infrared spectrum with a strong carbonyl absorption at 1730 cm$^{-1}$ and a strong C—O—C band at 1130 cm$^{-1}$.

The data indicates that the reaction product has the following structural formula:

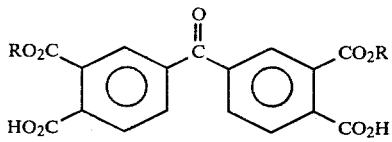

with R being a Pluronic polyol fragment. It is within the scope of this invention to react any benzophenonetetracarboxylic acid or benzophenonetetracarboxylic dianhydride (in particular, 3,3′,4,4′-benzophenonetetracarboxylic dianhydride) with any Pluronic polyol which is or will be available.

With the addition of these additives, fuel oil mixtures comprising a major portion of a petroleum middle distillate having an end point boiling range of from 660° to 675° F. and a substantial portion of a non-petroleum distillate, that is, other materials not derived from mineral oil, may be prepared. Prior to the discovery of the stabilizers of this invention, mixtures of mineral oil middle distillates and non-petroleum extenders would not have been commercially usable because of their inability to obtain a satisfactory rating in a Potential Deposits Test (P.D.). The non-petroleum extender may be employed in such a mixture in an amount ranging from about 5 to 20 percent of the total fuel composition, i.e., from 5-20 percent extender and from 95-80 percent middle distillate mineral oil, respectively. It is preferred to employ from about 10 to 15 percent of the extender in the fuel composition of the invention.

A base fuel blend of a mineral oil based diesel oil boiling at a temperature within the range of 500° to 675° F. (Pembroke diesel) at the end point and a middle distillate diesel fuel derived from shale oil (Paraho Shale) in a blend ratio of 9 to 1, respectively, is prepared. Three test samples were prepared from the base fuel blend as follows: (1) the base fuel itself without any additive, (2) a base fuel with the additive of the subject invention, and (3) a base fuel with N,N-dimethylcyclohexylamine, an additive which is currently used in industry to prevent the formation of insoluble precipitates in petroleum distillates extended with non-petroleum distillates.

The test samples were tested in the Potential Deposit Test. In this test, the samples were heated for two hours at 275° F. while air is continuously bubbled through the fuel at a rate of three liters per hour. At the end of the heating period, the fuel is cooled to 77° F., held at this temperature for one hour and then filtered through a number 1 Whatman filter paper. The deposits on the filter disc are visually compared to deposit standards which have been prepared on the basis of actual field experience. The greater the density of insoluble material on the filter disc, the higher the P.D. rating of the total fuel composition. Ratings are given on a scale of 0 to 4+: a 0 rating is best; a 2 rating is minimally acceptable; and a 4+ rating is the worst, indicating substantial amounts of insoluble materials on the filter from the tested fuel composition.

As an alternative measuring means, a reflection meter can be used to rate the test samples. The reflection meter measures the amount of light that would be allowed through an unused, clean test filter disc. This then becomes the base value and is contrasted with the amount of light that the test filter allows through. Again, as above, a 0 rating is the best.

Results of the Potential Deposits Test run on the base fuel without a stability additive, on a fuel composition of the invention and on a fuel composition containing a commercial fuel stability additive are set forth in Table I below.

TABLE I

POTENTIAL DEPOSITS TESTS (PD)
WITH A 90/10 BLEND OF
PEMBROKE/SHALE OIL DERIVED DIESEL FUELS

| EXAMPLE | | PD RATING* |
|---|---|---|
| 2 | Base Fuel Mixture | 4+, 4 |
| 3 | Base Fuel Mixture + 500 PTB of Example 1 | 0 |
| 4 | Base Fuel Mixture + 300 PTB of Example 1 | 1 |
| 5 | Base Fuel Mixture + 200 PTB of Example 1 | 1 |
| 6 | Base Fuel Mixture + 100 PTB of Example 1 | 1 |
| 7 | Base Fuel Mixture + 50 PTB of Example 1 | 1+ |
| 8 | Base Fuel Mixture + 500 PTB of Commercial Additive[1] | 3 |
| 9 | Base Fuel Mixture + 50 PTB of Commercial Additive[1] | 4+ |

*0 good, 4+ bad
1 = N,N—dimethylcyclohexylamine.

As the test results indicate, the fuel mixture with the subject additive achieved a passable rating, that is, a score of from 0 to 1+ when the additive is added in amounts of from 50 to 500 parts per thousand barrels (PTB). However, the fuel mixture with the N,N-dimethylcyclohexylamine (FOA-3) additive failed to achieve a satisfactory rating even when the FOA-3 was added in amounts as high as 500 PTB. In fact, the fuel mixtures (Examples 8 and 9) with the FOA3 additive did not achieve a significantly higher P.D. score in comparison with the mixture (Example 2) which did not contain any additives.

It has been unexpectedly and surprisingly found that with the addition of the subject additive, the storage stability of an extended distillate fuel mixture is improved; that is, the stability of a mixture comprising a major portion of a petroleum middle distillate and a substantial portion of a non-petroleum distillate is improved to the point where the extended fuel mixture is able to achieve a satisfactory P.D. rating.

What is claimed is:

1. A distillate fuel oil mixture comprising a major proportion of a mineral oil distillate boiling at a temperature within the range of 660°–675° F. at the end point and a substantial proportion of a non-petroleum distillate, said fuel oil mixture characterized by having excessive deposit forming properties, and containing an effective amount of a deposit inhibiting additive comprising the reaction product of a benzophenonetetracarboxylic dianhydride and a polyol having the following structure:

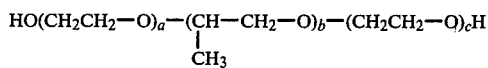

in which a has a value from 3–185, b has a value from 10–300, and c has a value from 3–185 where the polyol and dianhydride are present in a molar ratio of 0.75:1 to 1.25:1, respectively.

2. The fuel oil mixture as described in claim 1 wherein the polyol and dianhydride are present in a 1:1 molar ratio; the temperature at which the reaction is conducted ranges from 100°–175° C.; and wherein a has a value from 5–150 and b has a value from 10–60 and c has a value from 5–150.

3. The fuel oil mixture as described in claim 1 where the non-petroleum distillate is derived from shale oil.

4. A distillate fuel oil mixture comprising a major proportion of a mineral oil distillate boiling in the range of 660°–675° F. at end point and a substantial proportion of a non-petroleum distillate, said fuel oil mixture characterized by having excessive deposit forming properties, and containing an effective amount of a deposit inhibiting additive having the following structure:

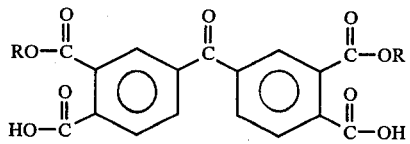

wherein R is selected from the group consisting of:

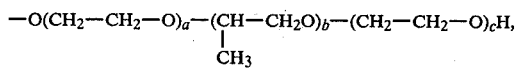

and

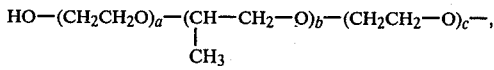

wherein a has a value from 3–185 and b has a value from 10–300 and c has a value from 3–185.

5. The fuel oil mixture as described in claim 4 wherein a has a value from 5–150 and b has a value from 10–60 and c has a value from 5–150.

6. The fuel oil mixture as described in claim 4 wherein the non-petroleum distillate is derived from shale oil.

7. The method of stabilizing a liquid hydrocarbon fuel mixture comprising a major part of a middle distillate boiling at a temperature within the range of 660°–675° F. at the end point and a minor part of a distillate from a non-petroleum source which method comprises adding to the fuel oil mixture the reaction product of a benzophenonetetracarboxylic dianhydride and a polyol wherein the polyol is present in a molar ratio ranging from about 0.75:1 to 1.25:1, based on the dianhydride, and wherein the polyol has the following structure:

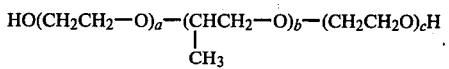

wherein a has a value from 3–185, b has a value from 3–300, and c has a value from 3–185.

8. A method of stabilizing a liquid hydrocarbon fuel mixture as described in claim 7, wherein the polyol has a molecular weight of 2650.

* * * * *